(12) United States Patent
Dressler

(10) Patent No.: US 10,981,130 B2
(45) Date of Patent: Apr. 20, 2021

(54) DEVICE AND METHOD FOR PRODUCING PULVERULENT PLASTICS WITH A SPHERICAL STRUCTURE

(71) Applicant: Dressler Group GmbH & Co. KG, Meckenheim (DE)

(72) Inventor: Axel Dressler, Alfter (DE)

(73) Assignee: DRESSLER GROUP GMBH & CO. KG

( * ) Notice: Subject to any disclaimer, the term of this patent is extended or adjusted under 35 U.S.C. 154(b) by 163 days.

(21) Appl. No.: 16/335,070

(22) PCT Filed: Sep. 8, 2017

(86) PCT No.: PCT/EP2017/072558
§ 371 (c)(1),
(2) Date: Mar. 20, 2019

(87) PCT Pub. No.: WO2018/054698
PCT Pub. Date: Mar. 29, 2018

(65) Prior Publication Data
US 2019/0275483 A1 Sep. 12, 2019

(30) Foreign Application Priority Data

Sep. 21, 2016 (DE) .................... 10 2016 117 767.9

(51) Int. Cl.
*B01J 2/04* (2006.01)
*B29B 9/10* (2006.01)
(Continued)

(52) U.S. Cl.
CPC . *B01J 2/04* (2013.01); *B01J 2/06* (2013.01); *B29B 9/10* (2013.01); *B29B 2009/125* (2013.01)

(58) Field of Classification Search
None
See application file for complete search history.

(56) References Cited

U.S. PATENT DOCUMENTS 3,166,613 A   1/1965  Wright et al.
3,408,007 A  10/1968  Raichle et al.
(Continued)

FOREIGN PATENT DOCUMENTS

CN        1469202 A   1/2004
CN      102436155 A   5/2012
(Continued)

OTHER PUBLICATIONS

Translation of EP0945173.*
(Continued)

*Primary Examiner* — Mary Lynn F Theisen
(74) *Attorney, Agent, or Firm* — McCarter & English, LLP

(57) ABSTRACT

Device for producing pulverulent plastics with a spherical structure comprises: a container delimiting an interior space, a nozzle device disposed in an upper region of the interior space and connected to a supplying conveyor pipe for a hot melt of the product, wherein the melt exits the nozzle device and separates into small droplets that fall downward in the interior space, a supply unit for a cryogas in a predominantly liquid state having several outlet openings, wherein a cryogas flow, which comes into contact with the small droplets, exits into the interior space. The supply unit is located above or at the same level as the nozzle device, and method wherein, the hot melt of the product exits the nozzle device in the shape of a spray cone, the cryogas flow exits the supply unit in the shape of a cone, and the spray cone is located within the cone.

19 Claims, 1 Drawing Sheet

(51) Int. Cl.
*B01J 2/06* (2006.01)
*B29B 9/12* (2006.01)

(56) References Cited

U.S. PATENT DOCUMENTS

| | | | |
|---|---|---|---|
| 5,475,984 A | 12/1995 | Fermani et al. | |
| 5,582,779 A * | 12/1996 | Gross | B01J 2/04 264/11 |
| 6,171,433 B1 | 1/2001 | Otaigbe et al. | |
| 6,903,065 B2 | 6/2005 | Nyssen et al. | |
| 8,883,905 B2 | 11/2014 | Takano et al. | |
| 2001/0038872 A1* | 11/2001 | Brooker | A23L 25/10 426/417 |
| 2006/0090595 A1* | 5/2006 | Furuya | B22F 9/08 75/338 |
| 2012/0052102 A1* | 3/2012 | Berghoff | B01J 2/06 424/401 |
| 2014/0000297 A1 | 1/2014 | Wieland | |

FOREIGN PATENT DOCUMENTS

| | | |
|---|---|---|
| DE | 2659546 A1 | 7/1978 |
| DE | 19758111 A1 | 7/1999 |
| DE | 10302979 A1 | 8/2004 |
| DE | 10339545 A1 | 3/2005 |
| DE | 202016106243 U1 | 11/2016 |
| EP | 0945173 A1 | 9/1999 |
| JP | S62-121634 A | 6/1987 |
| JP | 2006307168 A | 11/2006 |
| WO | 2004067245 A1 | 8/2004 |
| WO | 2010099966 A2 | 9/2010 |
| WO | 2012160532 A1 | 11/2012 |

OTHER PUBLICATIONS

International Search Report for Application No. PCT/EP2017/072558, dated Nov. 11, 2017, 4 pages.
Written Opinion for Application No. PCT/EP2017/072558, dated Nov. 11, 2017, 7 pages.

* cited by examiner

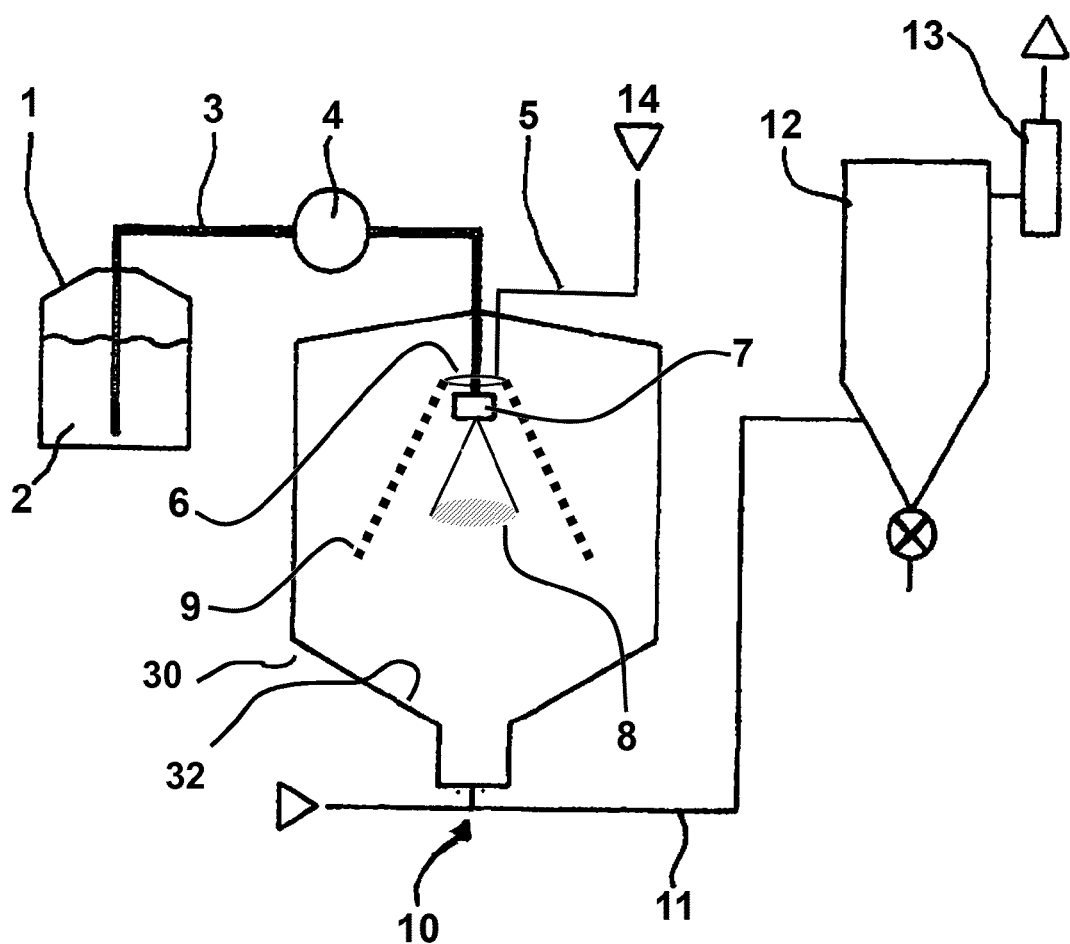

DEVICE AND METHOD FOR PRODUCING PULVERULENT PLASTICS WITH A SPHERICAL STRUCTURE

CROSS-REFERENCE TO RELATED APPLICATIONS

This application is a national stage application of international application no. PCT/EP2017/072558 filed Sep. 8, 2017, entitled "Device and Method for Producing Pulverulent Plastics with a Spherical Structure," claiming priority to German application no. DE 10 2016 117 767.9 filed Sep. 21, 2016, which are hereby expressly incorporated by reference as part of the present disclosure.

FIELD OF THE INVENTION

The present disclosure generally relates to a device and a method for producing pulverulent substances, for example, of plastics, with as spherical a structure as possible.

BACKGROUND

Such a method and such a device are known from EP 945 173 B1. In this case, a temperature gradient with substantially three zones is formed in the interior space of the container, namely, viewed from top to bottom, a hot zone, a fixing zone, which is cooler in comparison, and a cooling zone, which in turn is cooler than the latter. This method and the device have proved their worth in principle and are being used in a multitude of cases. In operation, however, it was found time and again that deposits of the product accrue on the supply unit. It was also found that the product occasionally deposits on the walls of the interior space.

U.S. Pat. No. 6,903,065 B2 describes this three-layer method according to the above-mentioned European patent specification EP 945 173 B1. The patent itself relates to the manufacture of typical particle sizes of 50 µm to 300 µm, in particular greater than 100 µm.

From the German unexamined applications DE10302979 A1 and DE10339545 A1 and the international application WO 2004/067245 A1 by the same applicant, a method is known in which a viscous starting material is produced in an extruder, which is then sprayed in an atomizing device to form melt droplets. In a cooling device, the melt droplets are cooled down to such an extent that powder particles produced from the starting material substantially have no surface tack anymore. Compressed air is supplied to the atomizing device at the nozzle outlet; therefore, it operates like a water jet pump. These documents also mention DE 197 58 111 and describe the problem when plastics are sprayed, namely, that higher-viscosity plastic cannot be processed as DE 197 58 111, which is preferably designed for the production of metal powders, describes. At the higher temperatures at which the plastics would have a sufficiently low viscosity, they would already chemically decompose. However, that is exactly what is to be avoided. The problem with spraying plastics is rather that the product to be sprayed has a higher viscosity. It has to be sprayed at temperatures at which it is not yet chemically altered.

U.S. Pat. No. 6,171,433 B1 also operates in accordance with the atomization method. Nozzles for the atomization of high-viscosity substances, in particular plastics, are known from U.S. Pat. Nos. 3,166,613 A and 3,408,007 A.

U.S. Pat. No. 8,883,905 B2 relates to a powder coating material. It describes plastic particles associated with pigment particles. The plastic particles have a grain size in the range of 5 to 100 µm, in particular 15 to 60 µm.

The aim is medium grain sizes of less than 500, in particular less than 100 µm, e.g. particles in the range of 30 to 100 µm. The maximum upper limit that can be specified is 800 µm. The fine-grained material present in the discharge device can be treated in a further step; for example, a particulate matter content may be separated, i.e. particles smaller than, for example, 45, 10 or 5 µm. In another step, a content with a size larger than 100 µm may be returned to a treatment process, e.g. a grinding process.

SUMMARY

It is an object to improve and develop the previously known devices and methods, such as according to EP 945 173 B1, such that deposits of the product on the supply unit and the walls of the interior are avoided as far as possible, and that the size of the obtained spherical structures can be specifically influenced.

This object is accomplished by a device for producing pulverulent substances, for example, made of plastics, with as spherical a structure as possible, wherein a chemical-technical product is sprayed and cooled off, comprising: a) a container delimiting an interior space, b) a nozzle device, which is disposed in an upper region of the interior space and which is connected to a supplying conveyor pipe for a hot melt of the product, wherein the melt exits the nozzle device and separates into small droplets that fall downward in the interior space, c) a supply unit for a cryogas, such as $CO_2$ or $N_2$, having several outlet openings, which are disposed in a circumferentially distributed manner and to which the cryogas is supplied in a predominantly liquid state, and which a cryogas flow, which comes into contact with the small droplets, exits into the interior space, and d) a pneumatic discharge device in the lower region of the interior space for discharging the cooled-off, pulverulent substance; in this case, the supply unit is located, for example, above or at the same level as the nozzle device, and in any case above and outside a spray cone of the nozzle device.

The object is further accomplished by a method for producing pulverulent substances, for example, plastics, with as spherical a structure as possible, by a chemical-technical product being sprayed and cooled off, comprising the following method steps: e) providing a container delimiting an interior space, f) providing a nozzle device and disposing the nozzle device in an upper region of the interior space, supplying a hot melt of the product to the nozzle device, which the melt, separated into small droplets, exits, and the droplets fall downward in the interior space, g) providing a supply unit for a cryogas, such as $CO_2$ or $N_2$, having several outlet openings, which are disposed in a circumferentially distributed manner and to which the cryogas is supplied in a predominantly liquid state, and which a cryogas flow, which comes into contact with the small droplets, exits into the interior space, and h) providing a pneumatic discharge device for discharging the cooled-off, pulverulent substance, and disposing the discharge device in the lower region of the interior space, wherein the hot melt of the product exits the nozzle device in the shape of a spray cone, the cryogas flow exits the supply unit in the shape of a cone, and the spray cone is located within the cone.

In at least some embodiments, the supply unit is located above or at the same level as the nozzle device. It is arranged such that it is avoided that droplets or particles coming from the nozzle device are able to hit the supply unit. In at least some embodiments, the hot melt of the product exits the nozzle device in the shape of a spray cone; the cryogas flow exits the supply unit in the shape of a cone, for example, of an envelope of a cone. If the spray cone is located within the cone, the cryogas flow forms an envelope around the spray cone. Thus, the particles are prevented from being able to reach the wall of the interior space and adhere there. The yield is thus increased. The supply unit may also be disposed underneath the nozzle device, as long as it is located outside the spray cone. The arrangement of the supply unit above the nozzle device, or at least in the vicinity of the nozzle device, provides the possibility for an enveloping flow of the cryogas. In at least some embodiments, the supply unit is ring-shaped. The distance from the nozzle device, however, should be no greater than the largest internal diameter of the supply unit, in in at least some embodiments, no greater than the diameter of the supply unit.

Surprisingly, it was found that the size of the droplets exiting the supply unit correlates with the grain size or fineness of the powder obtained. The size of the droplets is an essential parameter for the grain size distribution of the product in the discharge device.

A rotationally symmetric arrangement of the supply unit and the nozzle device may be used in some embodiments. Cryogas may be supplied through a ring system. In at least some embodiments, the nozzle device is disposed in the center thereof, or on a central axis. The vertical distance between the supply unit and the nozzle device may be smaller than an external dimension, and in some embodiments, than an internal dimension, of the supply unit. The clear internal dimension of the supply unit may be greater than an external dimension of the nozzle device, viewed in a direction transverse to the vertical.

The volumetric flow of the cryogas is adapted to the quantity of heat to be dissipated of the particle flow leaving the nozzle device. The volumetric flow of the cryogas can be present in an atomized form or in the form of droplets of different sizes from the supply unit and in the container. In at least some embodiments, the volumetric flow can be adjusted by means of pressure on the cryogas, by means of the number of outlet openings and their cross section. In at least some embodiments, the supply unit has outlet openings that are adjustable in size. In at least some embodiments, the total surface area of all outlet openings always remains constant, or in any case remains constant to plus/minus 50%, independently of the respective size of the outlet openings. In this way, the volumetric flow of the supplied cryogas remains independent of the setting of the outlet cross section of the outlet openings. It is also possible to provide a number of different rings for the supply unit and only dispose one of these rings in each case in the container in a replaceable manner, or to disposed several rings in the container and only use one in each case. Irrespective of the configuration of the supply unit, in at least some embodiments, all outlet openings have the same outlet cross section. The particle size can be adjusted by means of the cross section of the outlet openings. In practical application, the latter in at least some embodiments is between 0.1 and 8 mm, and in at least some such embodiments, between 2 and 6 mm.

This summary is not exhaustive of the scope of the present aspects and embodiments. Thus, while certain aspects and embodiments have been presented and/or outlined in this summary, it should be understood that the present aspects and embodiments are not limited to the aspects and embodiments in this summary. Indeed, other aspects and embodiments, which may be similar to and/r different from, the aspects and embodiments presented in this summary, will be apparent from the description, illustrations, and/or claims, which follow.

It should also be understood that any aspects and embodiments that are described in this summary and do not appear in the claims that follow are preserved for later presentation in this application or in one or more continuation patent applications.

BRIEF DESCRIPTION OF THE DRAWINGS

Other advantages and features will become apparent from the following description, which shall be understood not to be limiting and which will be explained below with reference to the drawing.

FIG. 1 is a schematic representation of a device for producing pulverulent plastics with as spherical a structure as possible.

DETAILED DESCRIPTION

A right-handed orthogonal x-y-z coordinate system is used for the description. The z-axis extends vertically and in a downward direction. The x-y-plane is horizontal.

The product 2 is conveyed from a melt container 1 via a conveyor pipe 3 for hot melt through a pump 4. For the product, temperatures may be used which are slightly beneath the temperature at which the product is chemically altered. In at least some embodiments, the viscosity of the product is selected to be as small as possible, because the spraying process is then easier to carry out than in the case of higher viscosity values.

Behind the pump 4, the conveyor pipe 3 leads into a container 30. The latter is generally cylindrical. Its internal diameter is, for example, between 1 and 4 m, in particular between 2 and 3 m. On the inside thereof, the container 30 may have a height of 6-12 m, in particular 8-10 m. The axis of the cylinder extends parallel to the z-axis. The bottom of the container 30 has the shape of a truncated cone and, at the bottom, leads into a port; a pneumatic discharge device 10 is provided there. The container 30 has an interior space 32.

The conveyor pipe 3, within the container 30, terminates in a nozzle device 7. As can be seen, the nozzle device 7 has no further feed pipes. The product is pressed through the nozzle at the pressure that the pump provides 4. In the known manner, the nozzle device 7 has a plurality of small nozzle openings. They are located at an undersurface of the nozzle device 7, and thus in the x-y-plane. The undersurface may be curved. It is centric with respect to the z-axis. The molten product exits the nozzle openings, e.g. in the form of thin threads that separate into droplets farther below. As the distance from the nozzle openings increases, the free-falling particles adopt an increasingly round shape; they fall downward in the z-direction in the interior space 32.

A feed pipe 5 for cryogas is provided, next to the conveyor pipe 3, from above through the upper container closure. The former comes from a source 14. Depending on the requirements, liquid nitrogen, $CO_2$ or the like are possible cryogases.

A supply unit or device 6 for cryogas is disposed slightly above the nozzle device 7 in the interior space 32. The distance in the z-direction is smaller than the outer diameter of the supply unit 6. The latter is connected to the feed pipe 5 and configured as a ring system. It consists of a tube, which is closed to form a circular ring and which has a plurality of outlet openings on its underside. This ring lies in the x-y-plane; the outlet opening point in the z-direction. They may be oriented at an angle to the z-direction of plus/minus 30°, in particular plus/minus 15°. An internal diameter of the supply unit 6 is greater than the external diameter of the nozzle device 7, in each case measured in the x-y-plane. The supply unit 6 is disposed centrically with respect to the container axis and the z-axis.

The hot melt of the product exits the nozzle device 7 in the shape of a spray cone 8, substantially in the z-direction. The cryogas flow leaves the supply unit 6 in the shape of a cone 9. The spray cone 8 and the cone 9 are coaxial. The spray cone 8 is located completely inside the cone 9. More specifically, the spray cone 8 and the cone 9 have the shape of a truncated cone. The cone 9 is oriented such and has a corresponding cone angle that it is substantially directed towards the bottom of the container 30. If anything, it is directed to only a lower part of the wall of the interior space 32, e.g. the lowermost 20% of the height of the cylindrical wall of the interior space 32. The spray cone 8 is oriented such that it is only directed towards the bottom of the container 30. The spray cone 8 and the cone 9 have a common axis. In the FIGURE, the y-axis extends perpendicularly to the surface of the paper. If the container with its fittings is viewed in the y-z-plane, the illustration does not change. In other words, the container with its fittings is rotationally symmetric apart from a feed pipe 5 and/or conveyor pipe 3 that are possibly arranged in a non-rotationally symmetric manner.

Because of the ring-shaped configuration of the supply unit 6, the cryogas exits the supply unit 6 in the shape of an envelope of a cone. In some embodiments, the nozzle device 7 disposed thereunder is not directly hit by the cryogas. It is located within the envelope of the cone. If the supply unit 6 is located slightly above or at the same level as the nozzle device 7, it is prevented that the nozzle device 7 itself is being cooled, i.e. that cryogas hits it directly. The supply unit 6 and the nozzle device 7 are arranged such that the envelope of the cone is located outside the nozzle device 7 and the supply unit 6 is so close to the nozzle device 7 in the z-direction that cryogas cannot end up on the nozzle device, nor can product end up on the supply unit 6.

The micro-plastic powder obtained is fed from the pneumatic discharge device via a pipe 11 to a fines separator 12; a cyclone is connected downstream from the latter. A conveying fan 13 is provided at the output. The finished product can be removed there.

The device for producing pulverulent plastics with as spherical a structure as possible comprises: a container 30 delimiting an interior space 32, a nozzle device 7, which is disposed in an upper region of the interior space 32 and which is connected to a supplying conveyor pipe 3 for a hot melt of the product 2, wherein the melt exits the nozzle device 7 and separates into small droplets that fall downward in the interior space 32, a supply unit 6 for a cryogas, having several outlet openings, to which the cryogas is supplied in a predominantly liquid state and which a cryogas flow, which comes into contact with the small droplets, exits into the interior space 32. The supply unit 6 is located above or at the same level as the nozzle device 7. As regards the method, the hot melt of the product 2 exits the nozzle device 7 in the shape of a spray cone 8, the cryogas flow exits the supply unit 6 in the shape of a cone, and the spray cone is located within the cone. The cryogas flow exiting the supply unit 6 is not directly directed towards the nozzle device 7 in at least some embodiments. It hits the spray cone below the nozzle device 7.

While the above describes certain embodiments, those skilled in the art should understand that the foregoing description is not intended to limit the spirit or scope of the present disclosure. It should also be understood that the embodiments of the present disclosure described herein are merely exemplary and that a person skilled in the art may make any variations and modification without departing from the spirit and scope of the disclosure. All such variations and modifications, including those discussed above, are intended to be included within the scope of the disclosure.

The invention claimed is:

1. A device for producing pulverulent plastics with a substantially spherical structure, wherein a chemical-technical product is sprayed and cooled off, comprising:
   a container defining an interior space,
   a nozzle device located in an upper region of the interior space and connected or connectable to a conveyor pipe for supplying a hot melt of the product to the nozzle device, configured so that the melt exits the nozzle device and separates into small droplets that fall downward within the interior space,
   a supply unit configured to supply a cryogas into the interior space and located above or at a same height as the nozzle device, having a plurality of outlet openings arranged in a circumferentially distributed manner to which the cryogas is suppliable in a predominantly liquid state and through which cryogas is flowable to exit into the interior space and come into contact with said small droplets, and
   a pneumatic discharge device in a lower region of the interior space configured discharge cooled-pulverulent plastics from the interior space,
   wherein the device is configured so that cryogas flow exits the supply unit into a shape of a cone that expands outwardly in the downward direction.

2. The device according to claim 1, wherein the supply unit defines a ring system.

3. The device according to claim 1, wherein the supply unit defines an open interior space defining internal dimensions greater than external dimensions of the nozzle device.

4. The device according to claim 1, configured so that hot melt of the product exits the nozzle device in a shape of a spray cone, and the spray cone shape of said hot melt is located within the cone shape of said cryogas.

5. The device according to claim 1, wherein the spray cone shape of said hot melt and the cone shape of said cryogas define a common axis, and the common axis extends parallel to a z-axis defined by a vertical direction.

6. The device according to claim 1, wherein the outlet openings define an open cross section of about 0.1 to 8 mm.

7. The device according to claim 6, wherein the outlet openings are adjustable and the size of the open cross section is adjustable in one or more of a stepped or continuous manner.

8. The device according to claim 1, wherein the nozzle device is connected or connectible to a second pipe configured to supply compressed air thereto.

9. The device according to claim 1, wherein a pump is located in the conveyor pipe.

10. The device according to claim 1, wherein the cryogas is $CO_2$ or $N_2$.

11. The device according to claim 2, wherein the supply unit defines a diameter of about 20 to about 100 cm.

12. The device according to claim 11, wherein the supply unit defines a diameter of about 30 to about 60 cm.

13. The device according to claim 3, wherein the open interior space defines an internal diameter greater than an external diameter of the nozzle device.

14. The device according to claim 6, wherein the outlet openings define an open cross section of about 2 to about 6 mm.

15. A method for producing pulverulent plastic with a substantially spherical structure, comprising:
spraying and cooling a chemical technical product, said spraying and cooling steps comprising:
supplying a hot melt of the product to a nozzle device located in an interior space of a container,
expelling the hot melt from the nozzle device in small droplets in a shape of a spray cone and so that the droplets fall downward within the interior space,
supplying a cryogas in a predominantly liquid state to a supply unit, having a plurality of outlet openings arranged in a circumferentially distributed manner,
flowing the supplied cryogas through the outlet openings and into the interior space in the shape of a cone that expands outwardly in the downward direction,
contacting the cryogas with the small droplets, and
discharging cooled-pulverulent plastic from the container with a pneumatic discharge device located in a lower region of the interior space.

16. The method according to claim 15, wherein the step of supplying hot melt includes supplying pressurized liquid hot melt to the nozzle device.

17. The method according to claim 15, further including flowing the cryogas into the interior space so as to substantially avoid contacting the nozzle device therewith within the interior space.

18. The method according to claim 15, wherein the cryogas is $CO_2$ or $N_2$.

19. The method according to claim 15, wherein the spray cone shape of the hot melt is located within the cone shape of the cryogas.

* * * * *